United States Patent Office 2,719,168
Patented Sept. 27, 1955

2,719,168

NEW CYCLOHEXYL-1-CYANO-1-(N-ACYL-N-ALKYL)-AMINES

Henry Martin, Zurich, Switzerland, assignor to Cilag Limited, Schaffhausen, Switzerland, a Swiss company No Drawing. Application December 17, 1952, Serial No. 326,591

Claims priority, application Switzerland January 11, 1952

5 Claims. (Cl. 260—464)

It has been found that cyclohexyl-1-cyano-1-(N-acyl-N-alkyl)-amines show outstanding properties as repellents. Applied in small doses only, biting flies, gnats of various kinds as, for instance, malaria gnats, mosquitos and other insects are prevented from setting down on body parts of human beings or animals, or any objects, which are covered or sprayed with such acylamines.

The production of these acyl amines is carried out according to known methods. Cyclohexyl-1-cyano-1-N-methylamine, for instance, is reacted with aliphatic, araliphatic or aromatic carboxylic acids, their reactive derivatives as halogenides, anhydrides etc., in the presence or absence of solvents, whereby these new amides are obtained in remarkably good yields. The reaction of salts of aliphatic, araliphatic, or aromatic carboxylic acids with reactive carbamic acid derivatives of cyclohexyl-1-cyano-1-N-alkyl amines represents another way of manufacture. Carbamic acid halogenides, for instance, may be reacted with alkali salts of the acids by heating under splitting off carbon dioxide and alkali halide. This listing does not claim any completeness; other known analogous processes may be used as well. An acylated cyclohexyl-1-cyano-1-amine, for instance, may subsequently be ethylated, allylated at the nitrogen atom of the acid amide. These reactions are known so that no further details are necessary.

It is known that amino nitriles show insecticidal properties (see the French Patent No. 851,479) which however, according to my tests, have no repellent effect on insects and have an unpleasant smell and therefore are not suitable for cosmetic purposes. Consequently, it was surprising to find that the referred to N-acyl amines show an intensive repellent effect. They are useful in keeping away a great number of blood-sucking, perhaps infecting, human beings and animals troubling arthropodes. The main purpose of these compounds is to prevent the insects from setting down on the human skin and from stinging, and the most important use, therefore, is the application on the human skin. They may also be applied to linen, clothing and other objects near the person which is to be protected, for instance, bed linen, curtains, walls. The effective substances may be used in their pure form or in form of solutions, powders, creams, pastes, emulsions, sprays, aerosols, or as vapors as for example in fumigating spirals or candles. The remedies may be provided with various additions, such as further repellent compounds as phthalic acid dialkyl esters, indalon, 2-ethyl hexyl diol-1,2, crotonic acid - N - ethyl - o - toluidide, o-chloro-benzoic acid diethyl amide, 3,4-dimethyl benzoic acid morpholide, o- and p-chloro-benzyl-acetoacetic acid diethyl amide or with sun lotions as unmbelliferon etc., with pigments, perfumes, conservating or desinfecting agents.

Example 1

138 gms. of cyclohexyl-1-cyano-1-N-methyl amine are dissolved in 250 ccs. of benzene and under cooling 58 gms. of n-butyric acid chloride are added drop by drop within one hour. The hydrochloric salt of the amine precipitates immediately. After the reaction is completed, the salt is sucked off, rewashed with benzene, and the hydrochloride of cyclohexyl-1-cyano-1-N-methylamine is obtained quantitatively. The benzenic filtrate is rewashed with water, then with 5% sodium hydroxide. The benzenic solution is separated, dried and distilled off. The residue represents a nearly colorless oil which slowly becomes solid. Recrystallised from hexane, it forms colorless crystals, melting point 56°. I obtained 102 gms. of the cyclohexyl-1-cyano-1-(N-butyroyl-N-methyl)-amine, i. e. 98% of the theoretical yield. Instead of n-butyric acid chloride, crotonic acid chloride, benzoyl chloride, o-chloro-benzoyl chloride, or acetyl chloride may be used. The cyclo hexyl-1-cyano-1-N-ethyl amine may be acetylated, crotonoylated, or benzoylated according to the same process.

In a similar way as described in Example 1 the following compounds may be obtained:

(a) From 55 gms. of cyclohexyl-1-cyano-1-methyl amine in 150 ccs. of benzene and 24 gms. of n-propionic acid chloride in 30 ccs. of benzene, cyclohexyl-1-cyano-1-(N-methyl-N-propionyl)-amine, melting point 58–59°, and boiling under 0.05 mm. at 125–127°.

(b) From 55 gms. of cyclohexyl-1-cyano-1-methyl amine in 130 ccs. of benzene and 23 gms. of crotonic acid chloride in 30 ccs. of benzene, cyclohexyl-1-cyano-1-(N-methyl-N-crotyl)-amine, boiling under 0.16 mm. at 136–138°, crystallising to colorless crystals after some standing, which crystals, when recrystallised from acetone and petroleum ether, melt at 73.5–74°.

(c) From 55 gms. of cyclohexyl-1-cyano-1-methyl amine in 130 ccs. of benzene and 27 gms. of n-valerianic acid chloride in 30 ccs. of benzene, cyclohexyl-1-cyano-1-(N-methyl-N-n-valeroyl)-amine, boiling under 0.12 mm. at 140°, crystallising to colorless crystals after some standing, and melting at 45.5–47°.

The following examples shall illustrate in which way my effective substances may be manufactured into various forms of repellents:

Example 2

35 parts of the effective substance of Example 1 are ground in a ball mill with 65 parts of talcum until uniform distribution is obtained. The powder obtained is suitable for cosmetic purposes.

Example 3

22 parts of cyclohexyl-1-cyano-1-(N-ethyl-N-acetyl)-amine are mixed with 25 parts of a high molecular greasy alcohol sulfate. Before use, the mixture is stirred in 50 parts of water whereby a milky emulsion is obtained.

Example 4

22 parts of cyclohexyl - 1 - cyano - 1 - (N - methyl - N - butyroyl)amine and 3 parts of castor oil are dissolved in 75 parts of isopropanol. A cosmetic lotion is obtained.

Example 5

10 parts of cyclohexyl - 1 - cyano - 1 - (N - methyl - N - butyroyl)amine, 10 parts of o-chlorobenzyl-aceto acetic acid diethyl amide, 5 parts of benzoic acid diethylamide are dissolved in 75 parts of isopropanol. The benzoic acid diethylamide may be replaced by dimethyl phthalate, olive oil, paraffin oil or crotonic acid-N-ethyl-o-toluidide.

Example 6

7 parts of paraffin, 16 parts of stearic acid, 6 parts of wool fat, 3 parts of wax, 1 part of triethanol amine, 4 parts of glycerol and 54 parts of water at 80° are stirred in the usual way under addition of a little concentrated ammonia and then treated with 20 parts of the effective substance of Example 1. This preparation may be used as ointment.

*Example 7*

Filter paper is moistened with an aqueous solution of potassium nitrate and dried. The impregnated paper is dipped into an acetonic solution of cyclohexyl-1-cyano-1-(N-methyl-N-butyroyl)amine and dried and may be used as fumigating paper.

What I claim is:
1. New chemical compounds of the formula

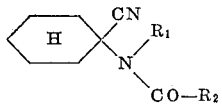

wherein $R_1$ is a radical selected from the class consisting of a methyl and an ethyl radical, and $R_2$ is a substituent selected from the group consisting of a lower alkyl radical and a lower alkenyl radical.

2. Cyclohexyl - 1 - cyano - 1 - (N - butyroyl-N-methyl)-amine.
3. Cyclohexyl - 1 - cyano - 1(N - propionyl-N-methyl)-amine.
4. Cyclohexyl - 1 - cyano - 1(N - valeroyl - N-methyl)-amine.
5. Cyclohexyl - 1 - cyano - 1(N - crotyl - N - methyl)-amine.

References Cited in the file of this patent

Carrington, J. Chem. Soc. (London) vol. 1948, pgs. 1619–22.

Ainley et al., Chem. Abstracts, vol. 43, col. 4415 (1949).

Carrington et al., Chem. Abstracts, vol. 44, col. 7778 (1950).

Houben et al., Beilstein (Handbuch, 4th ed.) vol. 14, 2nd Sup. page 204 (1951).